United States Patent [19]

Saito et al.

[11] Patent Number: 5,589,559
[45] Date of Patent: Dec. 31, 1996

[54] FLUOROELASTOMER AND PROCESS FOR PRODUCING THE SAME

[75] Inventors: Satoru Saito, Kitaibaraki; Haruyoshi Tatsu, Ibaraki, both of Japan; Lev S. German, deceased, late of Moscow, Russian Federation, by Elena N. German, legal representative

[73] Assignee: Nippon Mektron, Limited, Tokyo, Japan

[21] Appl. No.: 538,936

[22] Filed: Oct. 4, 1995

[30] Foreign Application Priority Data

Oct. 4, 1994 [JP] Japan .................................. 6-266246

[51] Int. Cl.$^6$ .......................................... C08F 16/24
[52] U.S. Cl. .................................................. 526/247
[58] Field of Search .......................................... 526/247

[56] References Cited

U.S. PATENT DOCUMENTS

| | | |
|---|---|---|
| 3,467,638 | 9/1969 | Pattison . |
| 3,682,872 | 8/1972 | Brizzolara et al. . |
| 4,743,300 | 5/1988 | Brinduse et al. . |
| 4,820,588 | 4/1989 | Brinduse et al. . |
| 4,981,727 | 1/1991 | Brinduse et al. . |

OTHER PUBLICATIONS

1988: 474137–Doc. No. 109: 74137 "Manufacture of peroxide derivatives of fluoropolymers" Brinduse et al.

Primary Examiner—Joseph L. Schofer
Assistant Examiner—N. Sarofim
Attorney, Agent, or Firm—Barnes & Thornburg

[57] ABSTRACT

A fluoroelastomer having a copolymer composition comprising 50 to 80% by mole of tetrafluoroethylene, 20 to 45% by mole of perfluoro(lower alkyl vinyl ether) and 0.1 to 2% by mole of perfluoro(allylbenzene), the sum total being 100% by mole, and an intrinsic viscosity of 0.1 to 2.0 dl/g has a good vulcanization rate.

2 Claims, 1 Drawing Sheet

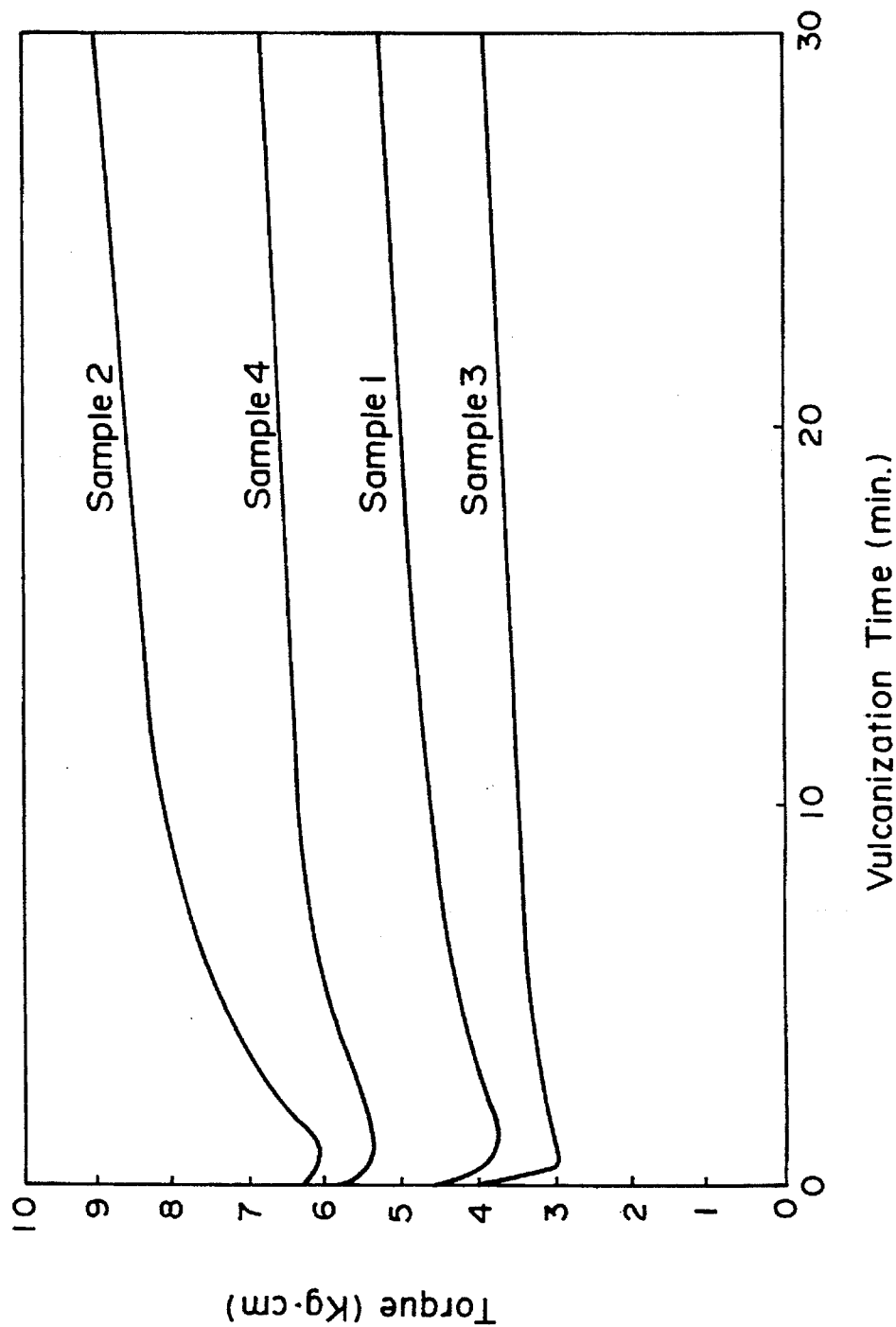

FLUOROELASTOMER AND PROCESS FOR PRODUCING THE SAME

BACKGROUND OF THE INVENTION

1. Filed of the Invention

The present invention relates to a fluoroelastomer and a process for producing the same, and more particularly a fluoroelastomer having a good vulcanization rate and a process for producing the same.

2. Description of Related Art

U.S. Pat. Nos. 3,467,638 and 3,682,872 disclose fluoroelastomers prepared by copolymerization of tetrafluoroethylene and perfluoro(lower alkyl vinyl ether) with perfluorovinylethers represented by the following formulae as cross-linkable groups:

    (n=0, 1, 2)

The fluoroelastomers with such copolymerized perfluorovinylethers are said to have a good oxidation stability at a high temperature, but their vulcanization rate is very low as a disadvantage. Thus, a vulcanization promoter such as dicyclohexyl-18-Crown-6, given below, etc. has been used, but no satisfactory vulcanization characteristics have been obtained yet:

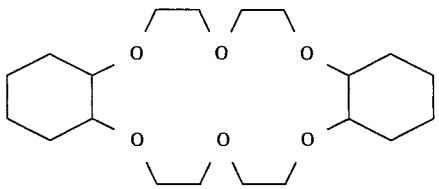

SUMMARY OF THE INVENTION

An object of the present invention is to provide a copolymer comprising tetrafluoroethylene, perfluoro(lower alkyl vinyl ether) and perfluorovinyl monomer as a cross-linkable groups, improving enough with respect to vulcanization rate.

According to the present invention, there is provided a fluoroelastomer having a copolymer composition comprising 50 to 80% by mole of tetrafluoroethylene, 20 to 45% by mole of perfluoro(lower alkyl vinyl ether), the sum total being 100% by mole, and 0.1 to 2% by mole of perfluoro(allylbenzene), and an intrinsic viscosity of 0.1 to 2.0 dl/g [measured at 35° C. as a 0.1 wt. % solution of perfluoro(2-butyltetrahydrofuran)].

The copolymer comprises 50 to 80% by mole, preferably 60 to 75% by mole, of tetrafluoroethylene, 20 to 45% by mole, preferably 25 to 35% by mole, of perfluoro(lower alkyl vinyl ether), for which perfluoro(methyl vinyl ether) is usually used, and 0.1 to 2% by mole, preferably 0.4 to 1% by mole, of perfluoro(allylbenzene).

Copolymer proportion of tetrafluoroethylene and perfluoro(lower alkyl vinyl ether) is an ordinary one so far used in these kinds of fluoroelastomers. As to the perfluoro(allylbenzene) to be copolymerized as a cross-linkable group, any copolymers having desired physical properties and vulcanization characteristics cannot be obtained below 0.1% by mole, whereas above 2% by mole processability of the resulting copolymer is lowered.

It is also possible to further copolymerize into the copolymer other vinyl monomers, for example, vinyl fluoride, vinylidene fluoride, trifluoroethylene, chlorotrifluoroethylene, perfluoro(alkyleneoxyalkyl vinyl ether), alkyl vinyl ether, ethylene, propylene, vinyl acetate, vinyl chloride, etc. within such a range as not to inhibit the object of the present invention, usually not more than about 20% by mole, on the basis of the copolymer.

The copolymerization reaction can be carried out by any one of polymerization procedures such as emulsion polymerization, suspension polymerization, solution polymerization, bulk polymerization, etc., among which emulsion polymerization is preferable from the economical viewpoint. Emulsion polymerization reaction is carried out usually at a temperature of about 40° to about 85° C. under a pressure of about 3 to about 8 MPa, using a water-soluble inorganic peroxide or its redox system as a catalyst and a surfactant such as ammonium perfluorooctanoate, etc.

Vulcanization of the thus obtained copolymers is carried out at a temperature of about 160° to about 250° C., using an aromatic difunctional compound represented by the following general formula:

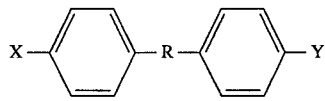

wherein R: $CF_2$, $C(CF_3)_2$, $SO_2$ or the like and X, Y: OH, $NH_2$, SH or the like, for example, an aliphatic diamine such as hexamethylenediamine, ethylene diamine, etc. or bisphenol AF, as in the case of other fluoroelastomers. To further enhance the vulcanization rate, it is effective to use a vulcanization promoter such as dicyclohexyl-18-Crown-6, etc. at the same time. Other components such as carbon black as a filler, a divalent metal oxide or hydroxide as an acid acceptor, etc. can be added to the copolymers to be vulcanized, if required.

By using perfluoro(allylbenzene) as perfluorovinylether to be copolymerized with tetrafluoroethylene and perfluoro(lower alkyl vinyl ether), fluoroelastomers having a good vulcanization rate can be obtained. The thus obtained fluoroelastomers have a good resistance to chemicals and a good heat stability and can be effectively used as molding materials for O-rings, flange seals, gaskets, diaphragms for stock pumps, liners, etc.

BRIEF DESCRIPTION OF THE DRAWING

FIG. 1 is a diagram showing changes in the vulcanization rate with time.

PREFERRED EMBODIMENTS OF THE INVENTION

The present invention will be described in detail below, referring to Examples, Comparative Example and Drawing.

EXAMPLE 1

4.38 g of $Na_2HPO_4$, 2.5 g of ammonium perfluorooctanoate and 200 ml of water were charged into a stainless steal autoclave having a capacity of 500 ml, provided with two valves, a gage, a safety valve, a stirrer and a temperature control unit, and then the inside gas was replaced with a nitrogen gas. After pressure reduction in the autoclave, 7.2 g of commercially available perfluoro(allylbenzene), 22 g of tetrafluoroethylene and 92 g of perfluoro(methyl vinyl ether)

were charged therein. After temperature elevation to 50° C., 25 ml each of aqueous solutions containing 0.75 g of sodium sulfite and 3.75 g of ammonium persulfate, respectively, were added thereto to conduct polymerization reaction for 6 hours. After purging of inside gas and successive salting-out, 30 g of copolymer having an intrinsic viscosity of 0.6 dl/g was obtained.

The resulting copolymer had an infrared absorption at a wave number of 1,512 cm$^{-1}$ and thus it was found that perfluoro(allylbenzene) was copolymerized. Furthermore, IR analysis and $^{13}$F-NMR analysis revealed that the copolymer had a copolymer composition consisting of 62.2% by mole of tetrafluoroethylene, 37.2% by mole of perfluoro(methyl vinyl ether) and 0.2% by mole of perfluoro(allylbenzene).

EXAMPLE 2

10 g of copolymer having an intrinsic viscosity of 0.5 dl/g was obtained in the same manner as in Example 1, except that the amount of perfluoro(allylbenzene) was changed to 10 g. The thus obtained copolymer had a copolymer composition consisting of 55.8% by mole of tetrafluoroethylene, 43.8% by mole of perfluoro(methyl vinyl ether) and 0.4% by mole of perfluoro(allylbenzene).

Comparative Example 30 g of copolymer having an intrinsic viscosity of 0.8 dl/g was obtained in the same manner as in Example 2, except that the same amount of perfluoro(2-phenoxy-1-vinyloxypropane) was used in place of perfluoro(allylbenzene). The thus obtained copolymer had a copolymer composition consisting of 65.0% by mole of tetrafluoroethylene, 34.5% by mole of perfluoro(methyl vinyl ether) and 0.5% by mole of perfluoro(2-phenoxy-1-vinyloxypropane).

Additives showing in the following Table were added to each of copolymers obtained in Example 2 and Comparative Example, and the resulting vulcanization mixtures were mixed each in a double roll mixer and then Δ torque value at 180° C. was measured with a curastmeter Type V (made by Orientec K. K., Japan) to make comparison of vulcanization rates. The results are shown in the following Table and FIG. 1.

TABLE

| | Sample 1 | Sample 2 | Sample 3 | Sample 4 |
|---|---|---|---|---|
| [Vulcanization mixture: parts by weight] | | | | |
| Copolymer of Example 2 | 100 | 100 | — | — |
| Copolymer of Comp. Ex. | — | — | 100 | 100 |
| Dicyclohexyl-18-Crown-6 | — | 2 | — | 2 |
| MT Carbon black | 10 | 10 | 10 | 10 |
| Bisphenol AF-K | 3 | 3 | 3 | 3 |
| Magnesium oxide | 4 | 4 | 4 | 4 |
| [Vulcanization rate] | | | | |
| Δ torque | 1.4 | 2.9 | 0.8 | 1.4 |

What is claimed is:

1. A fluoroelastomer having a copolymer composition comprising 50 to 80% by mole of tetrafluoroethylene, 20 to 45% by mole of perfluoro(lower alkyl vinyl ether) and 0.1 to 2% by mole of perfluoro(allylbenzene), the sum total being 100% by mole, and an intrinsic viscosity of 0.1 to 2.0 dl/g.

2. A fluoroelastomer having a copolymer composition according to claim 1, wherein perfluoro(lower alkyl vinyl ether) is perfluoro(methyl vinyl ether).

* * * * *